(12) United States Patent
Chung (10) Patent No.: US 11,700,788 B2
(45) Date of Patent: Jul. 18, 2023

(54) SWING ASSISTANCE DEVICE FOR BRUSH CUTTER

(71) Applicant: Sung Joe Chung, Osan-si (KR)

(72) Inventor: Sung Joe Chung, Osan-si (KR)

(*) Notice: Subject to any disclaimer, the term of this patent is extended or adjusted under 35 U.S.C. 154(b) by 475 days.

(21) Appl. No.: 17/017,712

(22) Filed: Sep. 11, 2020

(65) Prior Publication Data

US 2021/0127571 A1 May 6, 2021

(30) Foreign Application Priority Data

Oct. 31, 2019 (KR) .......................... 10-2019-0137279

(51) Int. Cl.
| | | |
|---|---|---|
| *A01D 34/74* | (2006.01) | |
| *A01D 34/81* | (2006.01) | |
| *A01D 34/86* | (2006.01) | |
| *A01D 34/82* | (2006.01) | |
| *A01D 34/90* | (2006.01) | |

(52) U.S. Cl.
CPC ............. *A01D 34/74* (2013.01); *A01D 34/81* (2013.01); *A01D 34/824* (2013.01); *A01D 34/863* (2013.01); *A01D 34/902* (2013.01)

(58) Field of Classification Search
CPC ...... A01D 34/74; A01D 34/81; A01D 34/824; A01D 34/863; A01D 34/902; A01D 34/84; A01D 34/86; A01D 34/866; A01D 34/416; A01D 34/001
See application file for complete search history.

(56) References Cited

U.S. PATENT DOCUMENTS

| | | | | |
|---|---|---|---|---|
| 3,977,163 A * | 8/1976 | Olin | ........................ | A01D 34/74 56/7 |
| 4,531,350 A * | 7/1985 | Huthmacher | .......... | A01D 34/90 280/47.2 |
| 4,715,460 A * | 12/1987 | Smith | ................... | B60B 19/003 180/7.1 |
| 7,036,297 B2 * | 5/2006 | Popp | ...................... | A01D 34/84 56/12.7 |
| 7,360,350 B1 * | 4/2008 | Smith, Jr. | ............ | A01D 34/416 56/12.7 |

(Continued)

FOREIGN PATENT DOCUMENTS

| | | |
|---|---|---|
| JP | 3103013 U | 7/2004 |
| JP | 2005343277 A | 12/2005 |
| JP | 3141500 U | 5/2008 |

(Continued)

*Primary Examiner* — Thomas B Will
*Assistant Examiner* — Julia C Tran (57) ABSTRACT

A swing assistance device for a brush cutter. The swing assistance device includes: a bracket; a coupling unit disposed on the top surface of the bracket, and coupled to a shaft at an inclined angle; left and right extension rods configured such that the outer ends thereof are located on both sides of a blade with the inner ends thereof coupled to both sides of the bracket; left and right rotation parts rotatably coupled to the outer ends of the left and right extension rods, and configured to, when the shaft swings in left-right directions, rotate while drawing arcs and assist in the swing operation; and a plurality of rotation rollers rotatably coupled to the outer circumference of each of the left and right rotation parts, and configured to, when the shaft swings in the left-right directions, rotate and assist in the swing operation.

5 Claims, 7 Drawing Sheets

(56) References Cited

U.S. PATENT DOCUMENTS

2009/0025352 A1* 1/2009 Angelle ............... A01D 34/001
83/13
2014/0223878 A1* 8/2014 Sassone ............... A01D 34/824
56/320.1

FOREIGN PATENT DOCUMENTS

| KR | 1020000006747 A | 2/2000 |
|---|---|---|
| KR | 200256445 Y1 | 12/2001 |
| KR | 1020050028231 A | 3/2005 |

* cited by examiner

SWING ASSISTANCE DEVICE FOR BRUSH CUTTER

CROSS REFERENCE TO RELATED APPLICATION

This application claims the benefit of Korean Patent Application No. 10-2019-0137279 filed on Oct. 31, 2019, which is hereby incorporated by reference herein in its entirety.

TECHNICAL FIELD

The present invention relates generally to a swing assistance device for a brush cutter, and more particularly to a swing assistance device for a brush cutter, which in a state of being coupled to the shaft of a brush cutter in an auxiliary manner, assists the brush cutter to be moved in left-right directions and front-back directions, and thus even a beginner can easily and conveniently perform mowing work.

TECHNICAL BACKGROUND

In general, brush cutters are popularized not only in farms but also in general households, and are widely used in mowing work for the graves of ancestors. Such a brush cutter is generally used in such a manner that a user holds an engine on his or her back, the power of the engine is transmitted to a blade attached to an end of a shaft via wire, and the blade is rotated by the power and cuts weeds. A user performs mowing work by moving the shaft, to which the blade is coupled, in front-back and left-right directions.

However, the mowing work must perform a swing operation while lifting the shaft to maintain a state of being spaced apart from the ground so that the blade does not hit the ground during the operation of swing the shaft, as described above. However, this swinging operation is not only very inconvenient for beginners, but may sometimes face dangerous situations.

As an example, an unskilled worker who is not familiar with the above-described handling characteristics digs the ground with the blade when handling or manipulating the brush cutter, is difficult to perform neat and tidy mowing work because the cut heights of weeds are not uniform, and due to inexperience in handling, and may suffer serious injuries by being hit by the blade or a fragment due to inexperience in operation.

Therefore, in order to overcome the above-described problems, there has been disclosed a swing assistance device for a brush cutter for supporting the blade of the brush cutter to be spaced apart from the ground at a predetermined height.

The conventional swing assistance device for a brush cutter is equipped with a rest in which wheels are attached to a shaft, and thus a blade is spaced apart from the ground by a predetermined height. However, the wheels have a structure that rotates only in the left-right directions or the front-back directions, and thus a problem arises in that a feeling of fatigue is increased because a swing operation is not free.

PRIOR ART DOCUMENTS

Patent document 1: Korean Patent Application Publication No. 10-2000-6747
Patent document 2: Korean Utility Model Registration No. 20-256445

DETAILED DESCRIPTION

Summary of Invention

Accordingly, an object of the present invention is to provide a swing assistance device for a brush cutter, which in a state of being coupled to the shaft of a brush cutter in an auxiliary manner, assists the brush cutter to be moved in left-right directions and front-back directions and enables a free swing operation, and thus even a beginner can easily and conveniently perform mowing work.

Another object of the present invention is to provide a swing assistance device for a brush cutter, which in a state of being coupled to the shaft of a brush cutter, enables the front left or front right inclination of the shaft using a pivot, and thus the height of a blade is lowered compared to a current location without changing the location of the shaft, thereby enabling weeds to be cut shorter.

Meanwhile, the objects of the present invention are not limited to the above-described objects, but other objects that are not described above will be clearly understood by those skilled in the art from the following description.

According to an aspect of the present invention, there is provided a swing assistance device for a brush cutter, the swing assistance device including: a bracket; a coupling unit disposed on the top surface of the bracket, and coupled to a shaft at an inclined angle; left and right extension rods configured such that the outer ends thereof are located on both sides of a blade coupled to an end of the shaft with the inner ends thereof coupled to both sides of the bracket; left and right rotation parts rotatably coupled to the outer ends of the left and right extension rods, and configured to, when the shaft swings in left-right directions, rotate while drawing arcs with respect to the ground and assist in the swing operation in the left-right directions; and a plurality of rotation rollers rotatably coupled to the outer circumference of each of the left and right rotation parts at predetermined intervals, and configured to, when the shaft swings in the left-right directions, rotate with respect to the ground and assist in the swing operation in the left-right directions by allowing the left and right rotation parts to be moved in front-back directions.

In this case, the slope adjustment unit may further include a slope adjustment unit disposed between the coupling unit coupled to the shaft and the bracket and configured to incline the location of the blade by changing the inclination of the shaft.

Furthermore, the coupling unit may include: a coupling block bolted to the bracket; an insertion depression formed in the center of the coupling block at an inclined angle, and configured to allow the shaft to be inserted and supported from one side; and a fastening screw configured to allow the coupling block to be fastened and coupled to the shaft by pressing the outer circumferential surface of the shaft inserted into the insertion depression.

Furthermore, the plurality of rotation rollers may be coupled to the outer circumference of each of the wheels in a vertical state, at an inclined angle, or in a rotatable manner.

Furthermore, the slope adjustment unit may include: a pivot structure coupled to the bracket and the front portion of the bottom surface of the coupling block, and to provide a pivot function such that the back portion of the bottom surface of the coupling block is spaced apart from the top surface of the bracket by a predetermined height by giving free play between the front portion of the bottom surface of the coupling block and the top surface of the bracket; and a restoration structure coupled to the bracket and the back portion of the bottom surface of the coupling block so as to face the pivot structure, and configured to allow the back portion of the bottom surface of the coupling block to be spaced apart from the top surface of the bracket by a predetermined height and also restoring the back portion of the bottom surface of the coupling block by using the pivot structure as an axis by providing restoring force using elasticity between the back portion of the bottom surface of the coupling block and the top surface of the bracket.

Moreover, the restoration structure may include: left and right fastening bolts of a predetermined length configured to pass through the back portion of the bottom surface of the coupling block from the bottom surface of the bracket; and restoration springs each configured to be supported between the bottom surface of the bracket and the head of a corresponding one of the fastening bolts with the fastening bolt passing through the back portion of the bottom surface of the coupling block, and to be contracted and allow the back portion of the bottom surface of the coupling block to be spaced apart from the top surface of the bracket by a predetermined height when external force is applied and to be extended and restore the back portion of the bottom surface of the coupling block to a state of being in contact with the top surface of the bracket when external force is removed.

BRIEF DESCRIPTION OF DRAWINGS

The above and other objects, features, and advantages of the present invention will be more clearly understood from the following detailed description taken in conjunction with the accompanying drawings, in which.

EMBODIMENTS

Embodiments of the present invention will be described in detail below with reference to the accompanying drawings.

Figure 1:
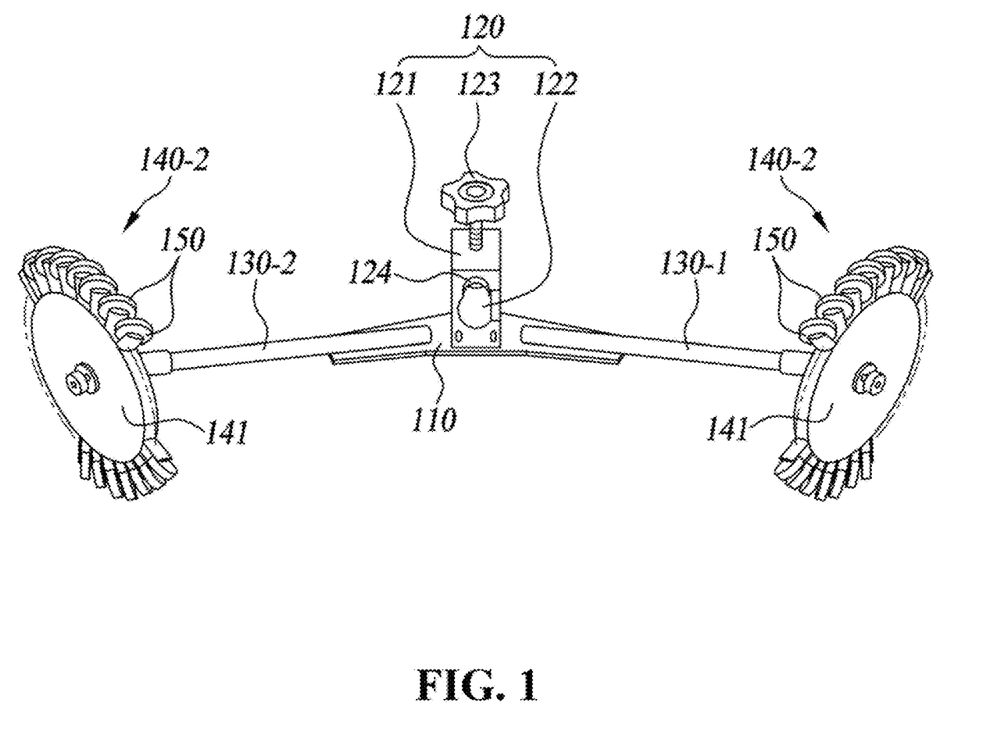
FIG. 1 is a perspective view showing a swing assistance device for a brush cutter according to an embodiment of the present invention.
Figure 2:
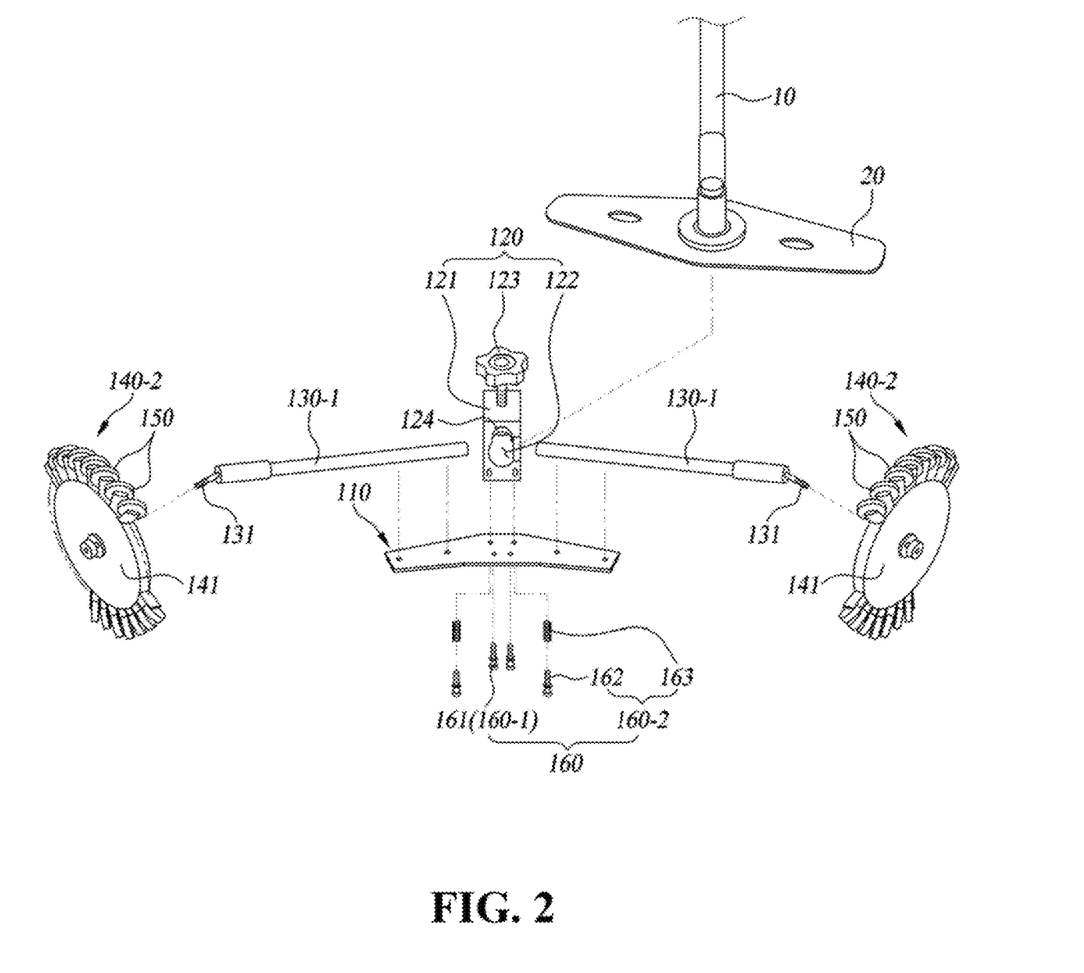
FIG. 2 is an exploded perspective view showing the swing assistance device shown in FIG. 1.
Figure 3:
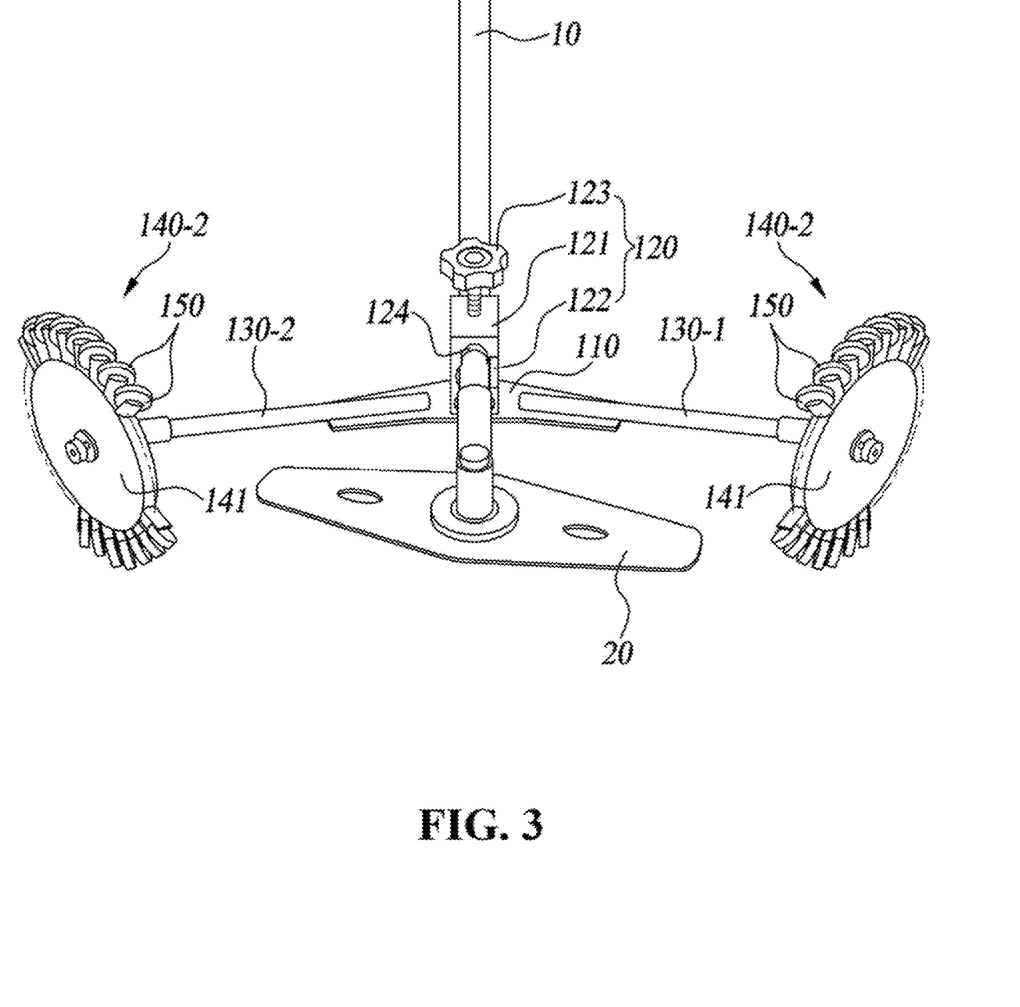
FIG. 3 is a view showing a state in which the swing assistance device shown in FIG. 1 is mounted on the shaft of a brush cutter.
Figure 4:
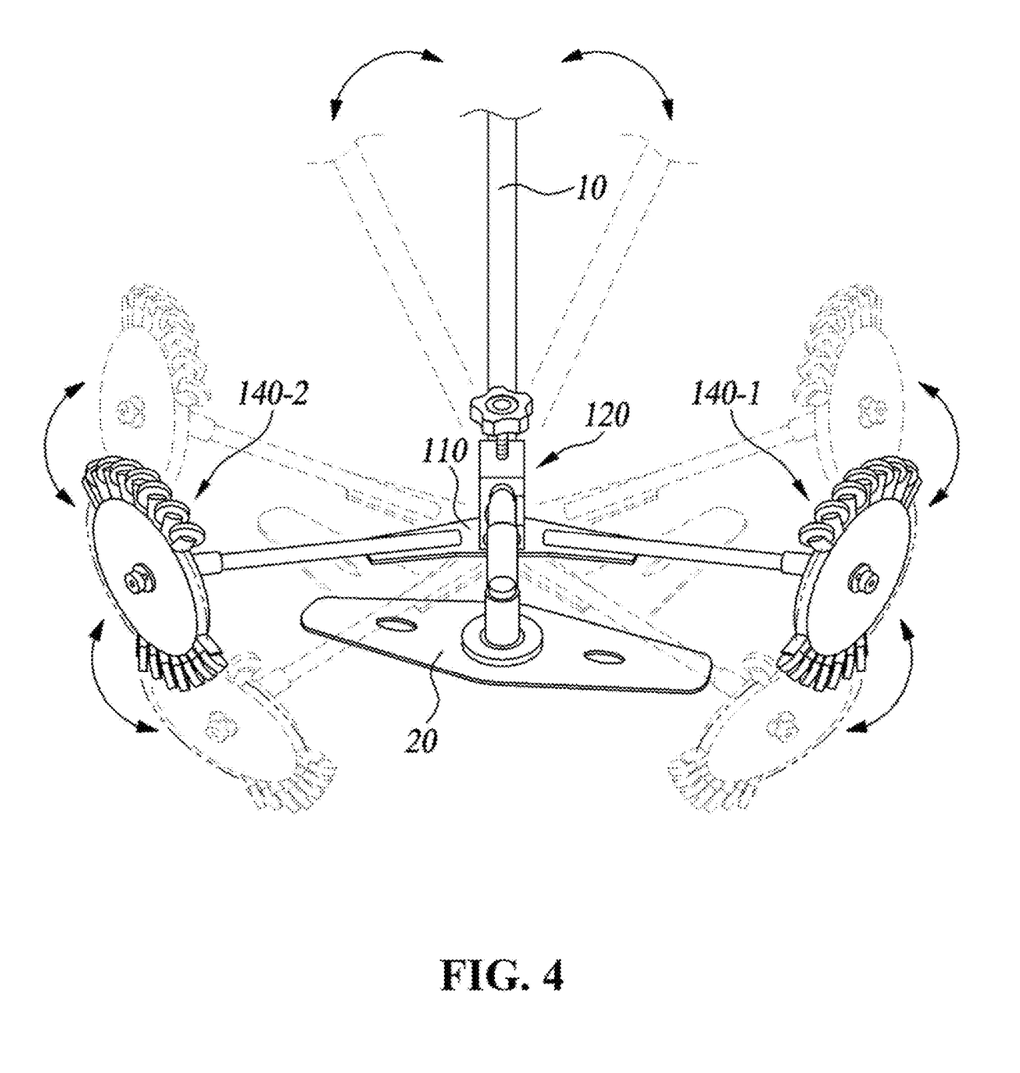
FIG. 4 is a view showing a state in which the shaft shown in FIG. 3 swings in left-right directions.
Figure 5:
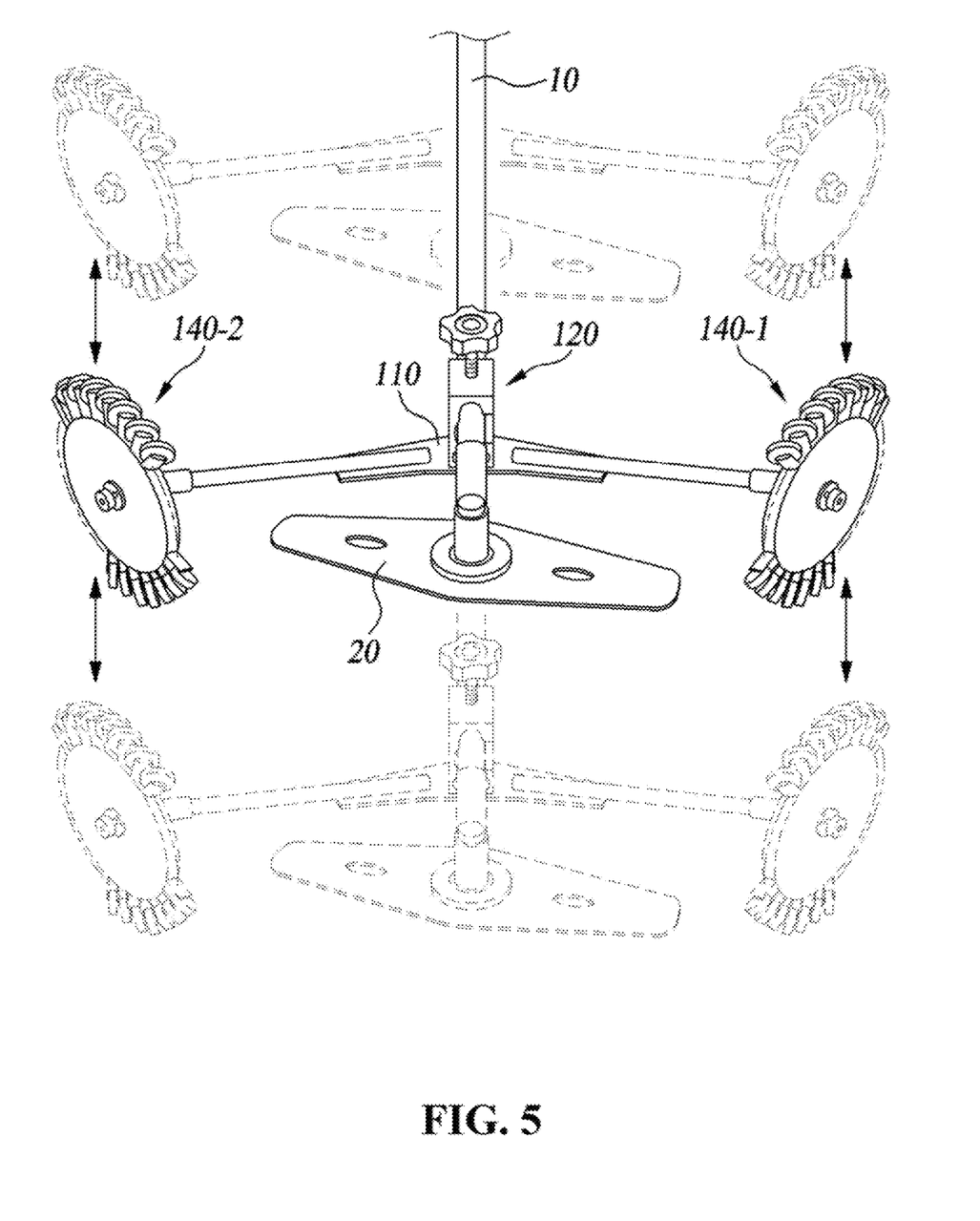
FIG. 5 is a view showing a state in which the shaft shown in FIG. 3 swings in front-back directions.
Figure 6:
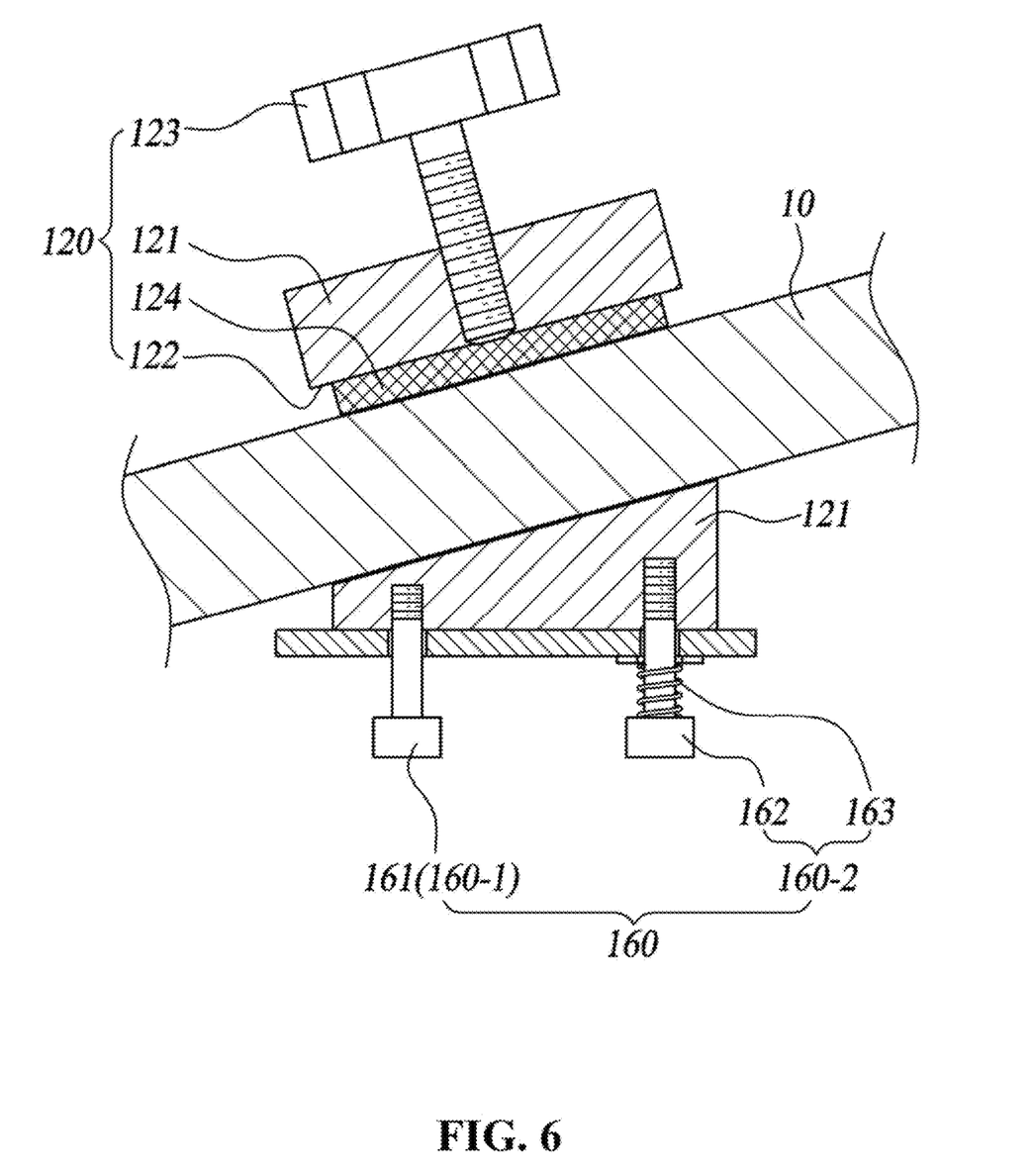
FIGS. 6 and 7 are views showing a state in which the shaft shown in FIG. 3 is inclined forward and thus the height of a blade is lowered.
Figure 7:
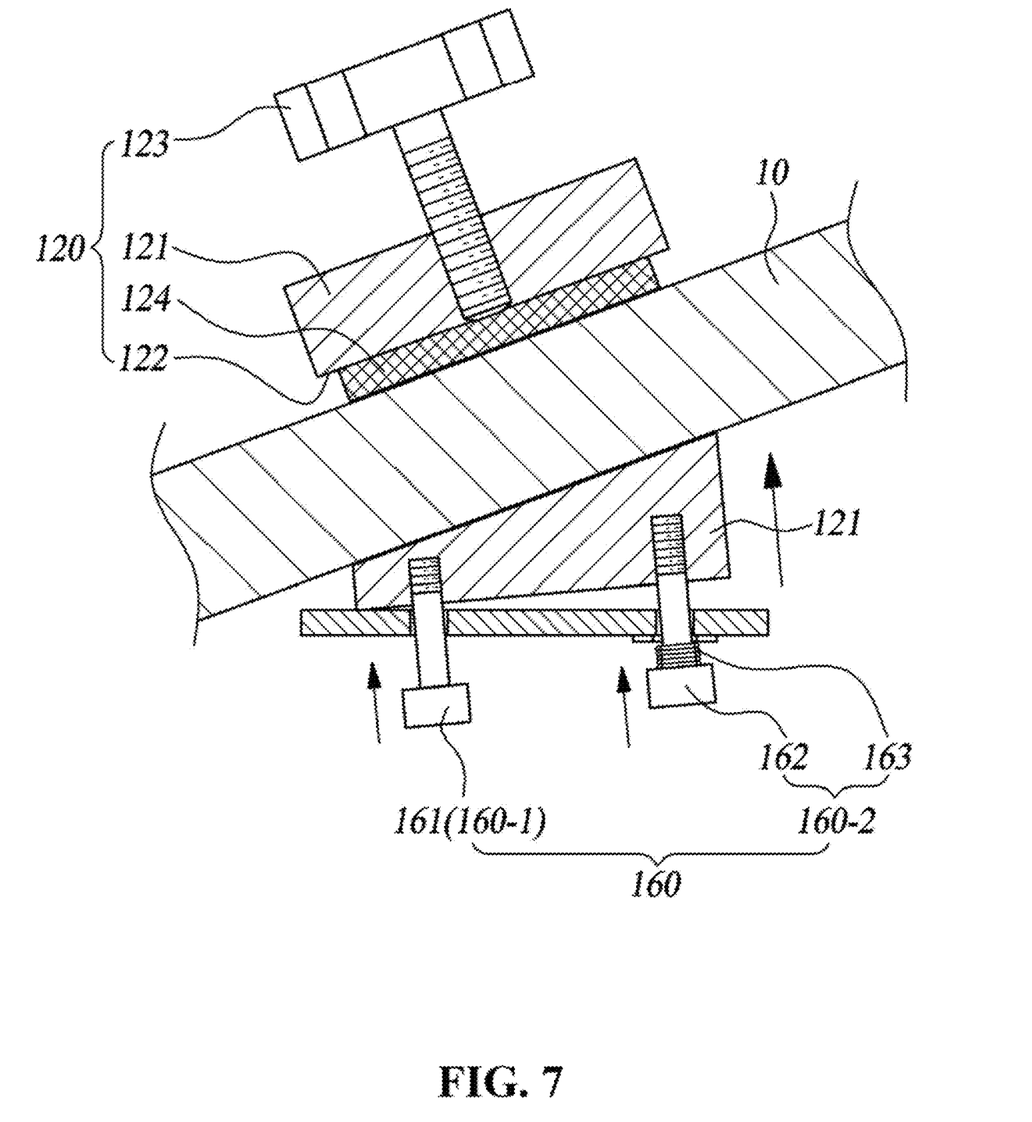

As shown in FIGS. 1 to 7, a swing assistance device for a brush cutter according to an embodiment of the present invention includes: a bracket 110; a coupling unit 120 disposed on the top surface of the bracket 110, and coupled to a shaft 10 at an inclined angle; left and right extension rods 130-1 and 130-2 configured such that the outer ends thereof are located on both sides of a blade 20 coupled to an end of the shaft 10 with the inner ends thereof coupled to both sides of the bracket 110; left and right rotation parts 140-1 and 140-2 rotatably coupled to the outer ends of the left and right extension rods 130-1 and 130-2, and configured to, when the shaft 10 swings in left-right directions, rotate while drawing arcs with respect to the ground and assist in the swing operation in the left-right directions; and a plurality of rotation rollers 150 rotatably coupled to the outer circumference of each of the left and right rotation parts 140-1 and 140-2 at predetermined intervals, and configured to, when the shaft 10 swings in the left-right directions, rotate with respect to the ground and assist in the swing operation in the left-right directions by allowing the left and right rotation parts 140-1 and 140-2 to be moved in front-back directions.

In this case, in the swing assistance device for a brush cutter according to the present invention, a slope adjustment unit 160 is disposed between the coupling unit 120 coupled to the shaft 10 and the bracket 110, so that the coupling unit 120 is inclined to a front left or front right side with respect to the bracket 110 by external force and thus the location of the blade 20 coupled to an end of the shaft 10 is temporarily lowered and so that, when the external force is removed, the coupling unit 120 is returned to its original location and thus the location of the blade 20 is moved to its original location.

The bracket 110 is a base member that allows the components to be coupled to the shaft 10 of the brush cutter. The bracket 110 may be made of a material that provides predetermined thickness and rigidity, and is preferably composed of a 'V'-shaped flat panel in order to minimize the weight thereof.

The coupling unit 120 is a coupling means that is disposed on the top surface of the bracket 110 and coupled to the shaft 10 at an inclined angle. The coupling unit 120 includes: a coupling block 121 bolted to the top surface of the bracket 110; an insertion depression 122 formed in the center of the coupling block 121 at an inclined angle, and configured to allow the shaft 10 to be inserted and supported from one side; and a fastening screw 123 configured to allow the coupling block 121 to be fastened and coupled to the shaft 10 by pressing the outer circumferential surface of the shaft 10 inserted into the insertion depression 122.

In this case, a clamp 124 having a depression so as to come into close contact with the outer circumferential surface of the shaft 10 is further provided at an end that faces the head of the fastening screw 123 and presses the outer circumferential surface of the shaft 10, and prevents the shaft 10 from being damaged and improves fastening force in the case of fastening to the shaft 10.

The left and right extension rods 130-1 and 130-2 are extension members that is configured such that the outer ends thereof are located on both sides of a blade 20 coupled to an end of a shaft 10 with the inner ends thereof coupled to both sides of the bracket 110. The left and right extension rods 130-1 and 130-2 may be made of a material that provides rigidity, and may be preferably composed of hollow pipes in order to minimize the weight thereof.

In this case, the left and right extension rods 130-1 and 130-2 are configured such that the inner ends thereof are bolted to both side ends of the bracket 110 and the outer ends thereof are coupled to coupling shafts 131 configured to allow the left and right rotation parts 140-1 and 140-2 to be rotatably coupled.

The left and right rotation parts 140-1 and 140-2 are members that are rotatably coupled to the outer ends of the left and right extension rods 130-1 and 130-2 and configured to, when the shaft 10 swings in left-right directions, rotate while drawing arcs with respect to the ground and assist in the swing operation in the left-right directions. The left and right rotation parts 140-1 and 140-2 include disk-shaped wheels 141 that are rotatably coupled to the coupling shafts 131 coupled to the outer ends of the left and right extension rods 130-1 and 130-2.

In this case, since a structure in which the wheel 141 and the coupling shaft 131 are rotatably coupled to each other has a well-known configuration, a detailed description thereof will be omitted.

Therefore, according to the left and right rotation parts 140-1 and 140-2, when the outer circumferences of the lower ends of the wheels 141 come into contact with the ground, the blade 20 coupled to the end of the shaft 10 is allowed to have a state of being spaced apart from the ground by a predetermined height. In this state, when the shaft 10 swings in the left-right directions, the wheels 141 rotate while drawing arcs, and thus the blade 20 and the ground may be kept spaced apart from each other without requiring a large amount of force, thereby minimizing the fatigue of an operator and improving operating efficiency.

The plurality of rotation rollers 150 are members that are rotatably coupled to the outer circumference of each of the left and right rotation parts 140-1 and 140-2 at predetermined intervals and configured to, when the shaft 10 swings in the left-right directions, rotate with respect to the ground and assist in the swing operation in the left-right directions by allowing the left and right rotation parts 140-1 and 140-2 to be moved in the front-back directions. The plurality of rotation rollers 150 are regularly coupled to the outer circumference of each of the wheels 141 in a vertical state, at an inclined angle, or in a rotatable manner.

Therefore, according to the plurality of rotation rollers 150, when the shaft 10 swings in the left-right directions, the plurality of rotation rollers 150 allow the wheels 141 to be rotated while coming into contact with and rubbing against the ground. When the shaft 10 swings in the front-back directions, the wheels 141 are not rotated but only the corresponding rotation rollers 150 in contact with the ground are rotated in the direction in which the shaft 10 is moved. Accordingly, the blade 20 and the ground may be kept spaced apart from each other without requiring a large amount of force, thereby minimizing the fatigue of an operator and improving operating efficiency.

In other words, the plurality of rotation rollers 150 are installed on the outer circumference of the wheel 141 at an angle by which rotation is performed when the part of the wheel 141 in contact with the ground is moved forward and backward. Through this, the frictional force applied to each of the wheels 141 is minimized even when the rotation direction of the wheels 141 and the proceeding direction of the shaft 10 intersect each other, thereby preventing a coupling structure with respect to the coupling shaft 131 from being forcibly disassembled by frictional force.

The slope adjustment unit 160 is a means that is disposed between the coupling unit 120 and the bracket 110 and allows the coupling unit 120 to be inclined to a front left or front right side with respect to the bracket 110. The slope adjustment unit 160 includes: a pivot structure 160-1 configured to pass through the bracket 110 from the bottom surface of the bracket 110, to be coupled to the front portion of the bottom surface of the coupling block 121, and to provide a pivot function when external force is applied such that the back portion of the bottom surface of the coupling block 121 is spaced apart from the top surface of the bracket 110 by a predetermined height by giving free play of a predetermined length between the front portion of the bottom surface of the coupling block 121 and the top surface of the bracket 110; and a restoration structure 160-2 configured to pass through the bracket 110 from the bottom surface of the bracket 110 so as to face the pivot structure 160-1, to be coupled to the back portion of the bottom surface of the coupling block 121, and to, when external force is applied, allow the back portion of the bottom surface of the coupling block 121 to be spaced apart from the top surface of the bracket 110 by a predetermined height and also restoring the back portion of the bottom surface of the coupling block 121 by using the pivot structure 160-1 as an axis by providing restoring force using elasticity between the back portion of the bottom surface of the coupling block 121 and the top surface of the bracket 110.

In this case, the pivot structure 160-1 includes left and right pivot bolts 161 of a predetermined length configured to pass through the front portion of the bottom surface of the coupling block 121 from the bottom surface of the bracket 110. Through the adjustment of the length of the pivot bolts 161, the spacing distance between the front portion of the bottom surface of the coupling block 121 and the top surface of the bracket 110 is adjusted.

Furthermore, the restoration structure 160-2 includes: left and right fastening bolts 162 of a predetermined length configured to pass through the back portion of the bottom surface of the coupling block 121 from the bottom surface of the bracket 110; and restoration springs 163 each configured to be supported between the bottom surface of the bracket 110 and the head of a corresponding one of the fastening bolts 162 with the fastening bolt 162 passing through the back portion of the bottom surface of the coupling block 121, and to be contracted and allow the back portion of the bottom surface of the coupling block 121 to be spaced apart from the top surface of the bracket 110 by a predetermined height when external force is applied and to be extended and restore the back portion of the bottom surface of the coupling block 121 to a state of being in contact with the top surface of the bracket 110 when external force is removed. Through the adjustment of the length of the fastening bolts 162 and the elastic coefficient of the restoration springs 163, the spacing height between the back portion of the bottom surface of the coupling block 121 and the top surface of the bracket 110 is adjusted.

Therefore, according to the slope adjustment unit 160, in the case where weeds in a specific location need to be cut a little shorter during mowing work through the operation of swinging the shaft 10 in left-right or front-back directions, when an operator applies external force to allow the back portion of the coupling block 121 to be spaced apart from the top surface of the bracket 110 by a predetermined height by using the front pivot structure 160-1 as an axis, the shaft 10 is inclined at a predetermined angle, and thus the front portion of the blade 20 may be conveniently lowered compared to a current work location. When the external force is removed, the coupling block 121 is brought into close contact with the top surface of the bracket 110 by the back restoration structure 160-2, and thus the slope of the shaft 10 is restored to its original location, so that the front portion of the blade 20 may have the original work location.

Furthermore, in the slope adjustment unit 160, the pair of pivot bolts 161 and the pair of fastening bolts 162 are installed on the left and right sides of the front portion of the bottom surface of the coupling block 121 and the left and right sides of the back portion of the bottom surface of the coupling block 121, and thus the coupling block 121 may be inclined to a front left or front right side with respect to the bracket 110. Accordingly, the location of the blade 20 coupled to the end of the shaft 10 is temporarily lowered to a front left or front right side, and is restored when the external force is removed. Through this, usability may be improved and operating efficiency may also be improved.

The operation of the swing assistance device for a brush cutter according to the embodiment of the present invention will be described, as follows:

First, the shaft 10 of the brush cutter is coupled to the coupling block 121 of the swing assistance device for a brush cutter, and the blade 20 coupled to the end of the shaft 10 has a predetermined height from the ground by the left and right rotation parts 140-1 and 140-2.

Thereafter, in the above-described state, the work of cutting weeds is performed using the brush cutter.

In this case, when an operator swings the shaft 10 of the brush cutter in left-right directions, the wheels 141 of the left and right rotation parts 140-1 and 140-2 located on both sides of the blade 20 are rotated while drawing arcs, and thus the blade 20 and the ground are kept spaced apart from each other. Accordingly, the fatigue of the operator may be minimized, and operating efficiency may be improved.

Furthermore, when an operator swings the shaft 10 of the brush cutter in front-back directions, the wheels 141 without the angle by which the shaft 10 is rotated in the front-back directions are not rotated, but the corresponding rotation rollers 150 rotatably disposed on the outer circumference of each of the wheels 141 and being in contact with the ground are rotated with respect to the front-back directions of the shaft 10, and thus the blade 20 and the ground may be kept spaced apart from each other without requiring a large amount of force. Accordingly, the fatigue of the operator may be minimized, and operating efficiency may be improved.

Meanwhile, as described above, in the case where weeds in a specific location need to be cut a little shorter during mowing work through the operation of swinging the shaft 10 in left-right or front-back directions, an operator allows the back portion of the coupling block 121 to be spaced apart from the top surface of the bracket 110 by a predetermined height by using the front pivot structure 160-1 as an axis, and thus the shaft 10 is inclined at a predetermined angle and the front portion of the blade 20 is conveniently lowered compared to a current work location, thereby improving work efficiency.

Therefore, as described above, according to the present invention, there is provided the swing assistance device for a brush cutter, which in a state of being coupled to the shaft of a brush cutter in an auxiliary manner, assists the brush cutter to be moved in left-right directions and front-back directions and enables a free swing operation, and thus even a beginner can easily and conveniently perform mowing work.

Furthermore, according to the present invention, there is provided the swing assistance device for a brush cutter, which in a state of being coupled to the shaft of a brush cutter, enables the front left or front right inclination of the shaft using a pivot, and thus the height of a blade is lowered compared to a current location without changing the location of the shaft, thereby enabling weeds to be cut shorter.

Meanwhile, the effects of the present invention are not limited to the above-described effects, but other effects that are not described above will be clearly understood by those skilled in the art from the foregoing description.

Although the above-described embodiments of the present invention have been described in detail above, various modifications may be made without departing from the scope of the present invention. Accordingly, the scope of the invention is not defined by the described embodiments, but should be defined by the attached claims and equivalents to the claims.

What is claimed is:

1. A swing assistance device for a brush cutter, the swing assistance device comprising:
   a bracket;
   a coupling unit disposed on a top surface of the bracket, and coupled to a shaft at an inclined angle;
   left and right extension rods configured such that outer ends thereof are located on both sides of a blade coupled to an end of the shaft with inner ends thereof coupled to both sides of the bracket;
   left and right rotation parts rotatably coupled to the outer ends of the left and right extension rods, and configured to, when the shaft swings in left-right directions, rotate while drawing arcs with respect to a ground and assist in the swing operation in the left-right directions;
   a plurality of rotation rollers rotatably coupled to an outer circumference of each of the left and right rotation parts at predetermined intervals, and configured to, when the shaft swings in the left-right directions, rotate with respect to the ground and assist in the swing operation in the left-right directions by allowing the left and right rotation parts to be moved in front-back directions; and
   a slope adjustment unit disposed between the coupling unit coupled to the shaft and the bracket, and configured to incline a location of the blade by changing an inclination of the shaft;
   wherein the slope adjustment unit comprises:
   a pivot structure coupled to the bracket and a front portion of a bottom surface of a coupling block, and to provide a pivot function such that a back portion of the bottom surface of the coupling block is spaced apart from the top surface of the bracket by a predetermined height by giving free play between the front portion of the bottom surface of the coupling block and the top surface of the bracket; and
   a restoration structure coupled to the bracket and the back portion of the bottom surface of the coupling block so as to face the pivot structure, and configured to allow the back portion of the bottom surface of the coupling block to be spaced apart from the top surface of the bracket by a predetermined height and also restoring the back portion of the bottom surface of the coupling block by using the pivot structure as an axis by providing restoring force using elasticity between the back portion of the bottom surface of the coupling block and the top surface of the bracket.

2. The swing assistance device of claim 1, wherein the coupling unit comprises:
   the coupling block bolted to the bracket;
   an insertion depression formed in a center of the coupling block at the inclined angle, and configured to allow the shaft to be inserted and supported from one side; and
   a fastening screw configured to allow the coupling block to be fastened and coupled to the shaft by pressing an outer circumferential surface of the shaft inserted into the insertion depression.

3. The swing assistance device of claim 1, wherein the plurality of rotation rollers are coupled to the outer circumference of each of the left and right rotation parts in a vertical state, at an inclined angle, or in a rotatable manner.

4. The swing assistance device of claim 1, wherein the restoration structure comprises:
- left and right fastening bolts of a predetermined length configured to pass through the back portion of the bottom surface of the coupling block from a bottom surface of the bracket; and
- restoration springs each configured to be supported between the bottom surface of the bracket and a head of a corresponding one of the fastening bolts with the fastening bolt passing through the back portion of the bottom surface of the coupling block, and to be contracted and allow the back portion of the bottom surface of the coupling block to be spaced apart from the top surface of the bracket by a predetermined height when external force is applied and to be extended and restore the back portion of the bottom surface of the coupling block to a state of being in contact with the top surface of the bracket when external force is removed.

5. The swing assistance device of claim 2, wherein the coupling unit further comprises a clamp configured to have a depression so as to come into close contact with the outer circumferential surface of the shaft and disposed at an end of the fastening screw.

\* \* \* \* \*